J. C. CAMPBELL.
Draft-Bar for Sleighs.

No. 211,967. Patented Feb. 4, 1879.

WITNESSES:
C. Bendixen,
J. Johnson

INVENTOR:
John C. Campbell
per E. Laass, Atty

UNITED STATES PATENT OFFICE.

JOHN C. CAMPBELL, OF SYRACUSE, NEW YORK.

IMPROVEMENT IN DRAFT-BARS FOR SLEIGHS.

Specification forming part of Letters Patent No. 211,967, dated February 4, 1879; application filed December 14, 1878.

*To all whom it may concern:*

Be it known that I, JOHN C. CAMPBELL, of the city of Syracuse, in the county of Onondaga, in the State of New York, have invented new and useful Improvements in Adjustable Draft-Bars for Sleighs, of which the following, taken in connection with the accompanying drawings, is a full, clear, and exact description.

This invention has reference to the adjustment of the position of the thill relative to the runner of the sleigh, for the purpose of allowing the horse to always travel the beaten track without straining either the horse or the sleigh.

The invention consists in the combination, with a thill movably connected to a cross-bar on the sleigh, of spring-dogs or spring-levers, arranged to confine the thill in its position, and a double cam engaging the said dogs, and having a lever connected with it, whereby the cam is operated and the thill released from its confinement and adjusted in its position with great facility and convenience by the occupant of the sleigh, all as hereinafter fully described.

Figure 1:
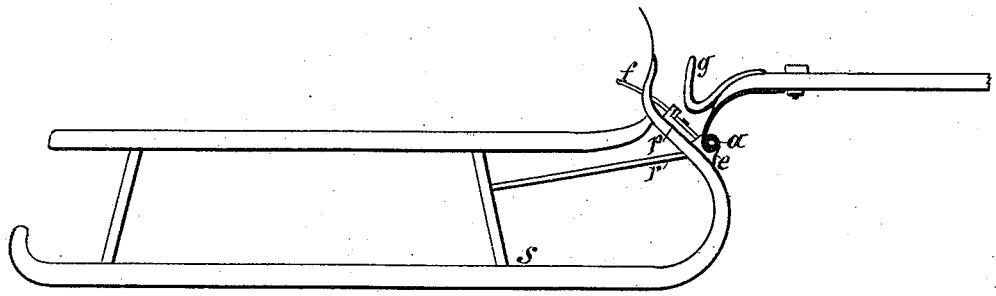
Figure 2:
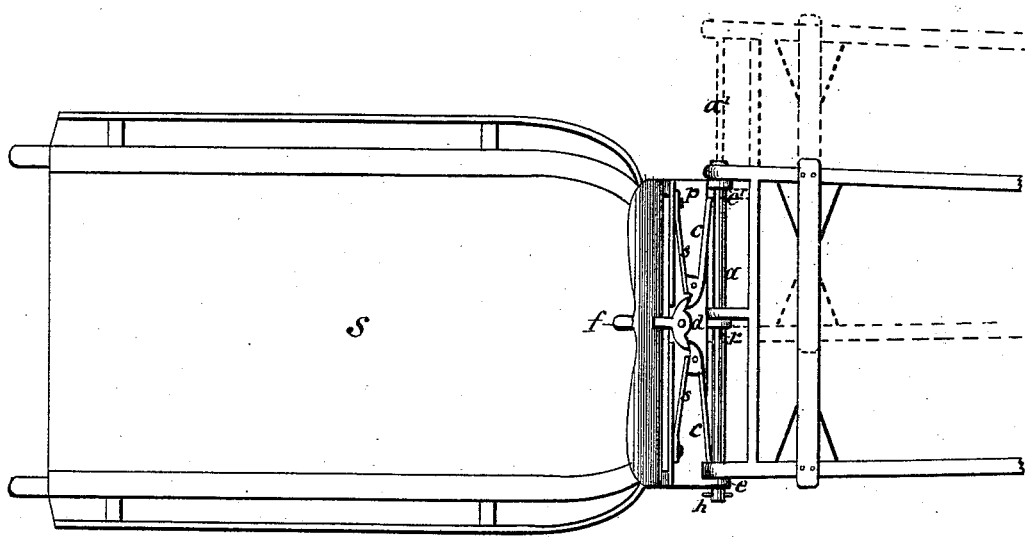

The invention is clearly illustrated in the accompanying drawings, wherein Figure 1 is a side view of a sleigh provided with my improvements, and Fig. 2 a plan view of same.

Similar letters of reference indicate corresponding parts.

S represents a sleigh or cutter, across the front end of which is rigidly secured a tubular bar, *a*, passing through an eye, *e*, on one side of the sleigh, and screwed into a threaded eye, *e'*, on the opposite side. The opposite end of the bar is provided with a suitable handle, *h*, by which the bar is turned into and out of the threaded eye *e'* without the aid of a wrench.

In the interior of the tubular bar *a* is arranged to slide a bar, *a'*, extending the length thereof and projecting out of one end.

The thill is at one side rigidly connected with the projecting end of the sliding bar, and at the opposite side arranged to slide on the stationary bar, and is thus allowed a lateral movement, in which it carries with it the sliding bar.

To limit the outward movement of the thill, and at the same time relieve the sliding bar, when in its extreme outer position, of the strain incident to the draft upon the thill, I connect the thill at or near its center loosely to the stationary bar by an additional coupling-arm or so-called "thill-iron," extended from the thill at that point, thereby throwing all, or nearly all, the strain directly upon the stationary bar, between the eyes *e e'*, containing same.

The tubular bar is braced at the center by a rod, *r*, connected with the frame of the sleigh. The thill is retained in its central and extreme outer positions by means of dogs or levers *c c*, fulcrumed on a plate, *p*, rigidly secured to the front of the sleigh, which levers are made to bear with their free end against the stationary bar by springs *s s*, suitably arranged for the purpose, and are of such lengths that the end of one will abut against the outer sliding thill-coupling when the thill is in its central position, and the end of the other lever will bear against the central thill-coupling when the thill is in its extreme outer position.

Between the fulcrums of the levers *c c* is a double cam, *d*, pivoted to the plate *p* aforesaid, and engaging with its two cams, respectively, the ends of the levers *c c* back of their fulcrums.

From the cam *d* is extended rearward an arm or lever, *f*, of sufficient length to be convenient of access for the person occupying the sleigh. By means of the said arm the cam is worked on its pivot and made to bear upon the rear end of that lever which confines the thill in its position, thereby raising the free end of said lever and causing it to release the thill whenever it is desired to change the position of the thill.

A handle, *g*, may be connected with the thill to assist in moving it.

Having thus described my invention, what I claim as new, and desire to secure by Letters Patent, is—

In combination with the thill-couplings arranged to slide on the stationary bar *a*, the pivoted spring-levers *c c* and the double cam *d*, having arm *f*, all constructed and combined to operate substantially in the manner and for the purpose specified and shown.

In testimony whereof I have hereunto set my hand this 5th day of December, 1878.

JOHN C. CAMPBELL.

Witnesses:
    E. BENDIXEN,
    J. JOHNSON.